Figure 1:
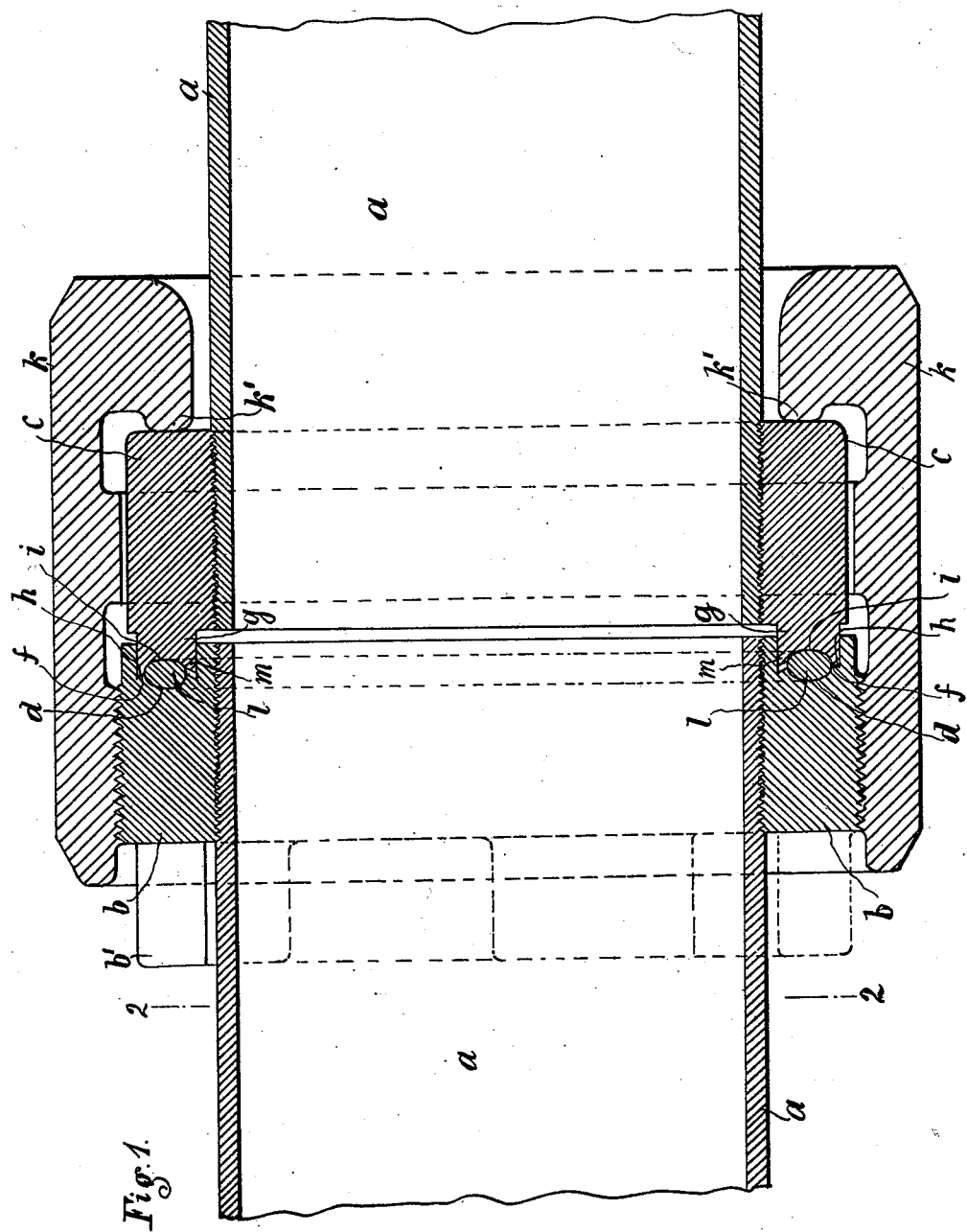

No. 648,232. Patented Apr. 24, 1900.
A. BRANDT.
PIPE JOINT.
(Application filed Aug. 25, 1899.)
(No Model.) 2 Sheets—Sheet 1.

WITNESSES
Walter Abbe
E. Alheim

INVENTOR
Alfred Brandt
by his Attorneys
Howson and Howson

No. 648,232. Patented Apr. 24, 1900.
A. BRANDT.
PIPE JOINT.
(Application filed Aug. 25, 1899.)
(No Model.) 2 Sheets—Sheet 2.
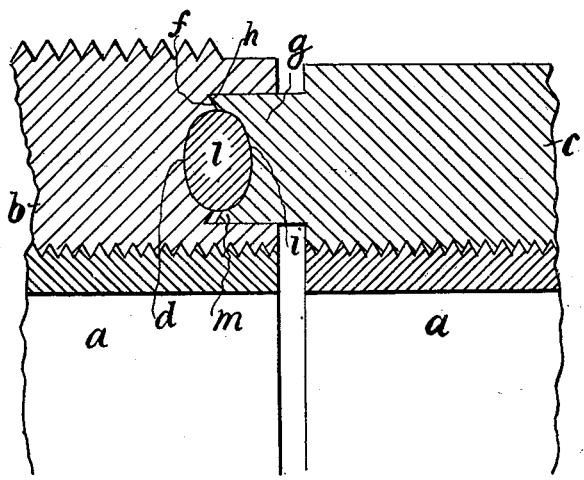
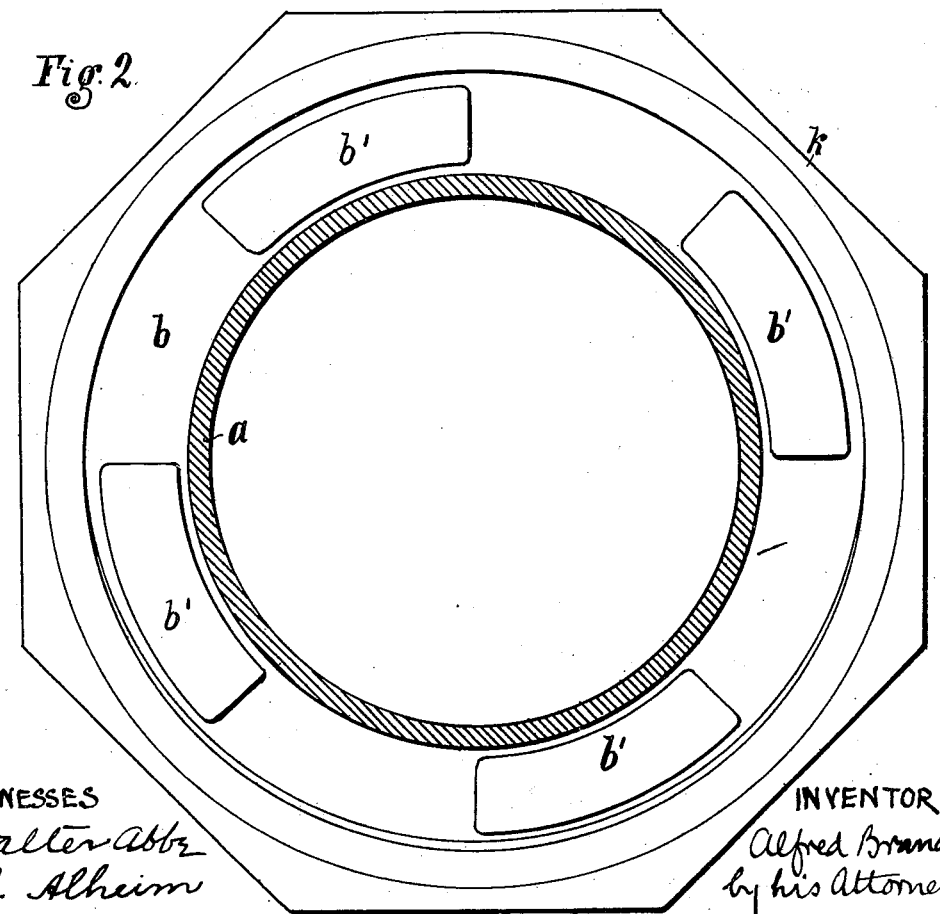
WITNESSES
Walter Abbe
E. Alheim
INVENTOR
Alfred Brandt
by his Attorneys
Howson and Howson

UNITED STATES PATENT OFFICE.

ALFRED BRANDT, OF HAMBURG, GERMANY.

PIPE-JOINT.

SPECIFICATION forming part of Letters Patent No. 648,232, dated April 24, 1900.

Application filed August 25, 1899. Serial No. 728,485. (No model.)

*To all whom it may concern:*

Be it known that I, ALFRED BRANDT, a subject of the German Emperor, residing at Hamburg, Germany, have invented certain new and useful Improvements in Pipe-Joints; and I do hereby declare the following to be a full, clear, and exact description of the invention, such as will enable others skilled in the art to which it appertains to make and use the same.

My invention has reference to pipe-joints, more especially such as are intended for the conveyance of fluids under high pressures; and the object of my invention is to so construct the joint that a perfectly-tight closure will be effected by a metal-to-metal joint, and, further, that the said joint will be protected from injury by the fluid contents of the pipe.

In the accompanying drawings, Figure 1 is a longitudinal section of a pipe-joint constructed in accordance with my invention. Fig. 2 is a transverse section on the line 2 2, Fig. 1; and Fig. 3 is a longitudinal section, on a larger scale, through a part of the pipe-joint.

The metal-to-metal joint may be formed in the metal of the pipe itself or in flanges forming part of the metal pipe; but I prefer to provide the adjacent ends $a$ $a$ of the pipes with collars $b$ and $c$, which may be screwed, welded, or otherwise suitably secured to the ends of the pipes. One of these collars—for instance, the collar $b$, which may be conveniently made of bronze—is provided with an annular groove $d$ with a bearing or packing face $f$, preferably inclined, as shown more clearly in Fig. 3. Into this annular groove $d$ fits an annular projection $g$ on the collar $c$, which may be conveniently made of steel. This annular projection has on its outer edge an inclined bearing-face $h$, which fits into and bears against the corresponding face $f$ of the collar $b$ when the pipes are joined together. The annular projection $g$ is also provided with an annular recess $i$, which will lie opposite the corresponding recess in the bottom of the groove $d$, these two recesses forming between them an annular channel for the reception of a soft packing $l$, of rubber or other suitable material, which will thus lie between the described metal-to-metal joint and the interior of the pipe to protect the said joint from corrosion or other injury by the fluid contents of the pipe. The inner edge $m$ of the annular projection $g$ is preferably made to project less than does the outer edge $h$, so that when the parts are fitted together the liquid contents of the pipe can get to the packing-ring $l$ and, exerting lateral pressure upon it, expand the said packing-ring and prevent the contents of the pipe from getting at the metal surfaces $f$ $h$.

Any suitable means may be provided for drawing the two ends of the pipes together to make the joint tight—as, for instance, the ordinary flanges, bolts, and nuts; but I prefer to use the hollow nut $k$ shown in the drawings. This nut has an inner shoulder $k'$ at one end to bear against one of the collars $c$, and at its opposite end it has an internal thread to engage with an external thread on the collar $b$, so that by turning the nut $k$ the pipe ends may be drawn together to bring the two surfaces $f$ $h$ tightly against each other. The end of the collar $b$ may be provided with suitable lugs $b'$ for the application of the tool to screw the collar onto the end of the pipe or to hold it against the screwing or unscrewing movement of the nut $k$. As, however, the metal packing described needs but very slight pressure to make the joint tight, but little force is necessary to complete the joint.

I should add that by the term "metal-to-metal joint" I mean a fluid-tight joint formed by contact, under suitable pressure, of two abutting metal faces, and in my device such a joint is shown, as before indicated, at $f$ $h$, which joint is protected from the action of the fluid in the pipe by means of the soft packing interposed between the said joint and the interior of the pipe.

Having thus described my invention, what I claim as new, and desire to secure by Letters Patent, is—

1. A pipe-coupling comprising a pipe end having a projecting annular edge, with another pipe end having an annular groove to form a metal-to-metal joint by the abutting metallic ends of the coupling, in combination with a packing of elastic material, interposed between said joint and the interior of the pipe, as and for the purpose defined.

2. A pipe-coupling consisting of a pipe end having a collar secured thereto, the said collar having a groove with inclined bearing-faces, in combination with another pipe end having an annular projection with an inclined bearing edge to fit that in the groove of the other pipe, forming a metal-to-metal joint, recesses in the adjacent parts of the collars and a packing of elastic material located in said recesses and interposed between the said bearing-faces and the interior of the pipe, substantially as described.

In testimony whereof I affix my signature in presence of two witnesses.

ALFRED BRANDT.

In presence of—
L. SOCKELSOCE ZOE,
A. VILLA.